(12) United States Patent
Ahuja

(10) Patent No.: US 12,223,504 B2
(45) Date of Patent: Feb. 11, 2025

(54) MERCHANT UNIVERSAL PAYMENT IDENTIFIER SYSTEM

(71) Applicant: Mastercard International Incorporated, Purchase, NY (US)

(72) Inventor: Sachin Ahuja, Millstone Township, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 176 days.

(21) Appl. No.: 17/469,053

(22) Filed: Sep. 8, 2021

(65) Prior Publication Data

US 2023/0070039 A1    Mar. 9, 2023

(51) Int. Cl.
*G06Q 20/40*  (2012.01)
*G06Q 20/38*  (2012.01)

(52) U.S. Cl.
CPC ... *G06Q 20/4014* (2013.01); *G06Q 20/38215* (2013.01); *G06Q 20/3825* (2013.01)

(58) Field of Classification Search
None
See application file for complete search history.

(56) References Cited

U.S. PATENT DOCUMENTS

| | | | |
|---|---|---|---|
| 8,985,445 B2 | 3/2015 | Patel et al. | |
| 11,159,326 B1 * | 10/2021 | Nelson | G06F 3/0484 |
| 11,380,139 B2 * | 7/2022 | Schleicher | G07B 17/00435 |
| 11,757,896 B1 * | 9/2023 | Gupta | H04L 63/102 |
| | | | 726/4 |
| 2013/0159186 A1 * | 6/2013 | Brudnicki | G06Q 20/385 |
| | | | 705/44 |
| 2014/0372308 A1 | 12/2014 | Sheets | |
| 2015/0052064 A1 * | 2/2015 | Karpenko | G06Q 20/3227 |
| | | | 705/71 |
| 2020/0065789 A1 * | 2/2020 | McCarthy | G06Q 20/20 |
| 2020/0186568 A1 * | 6/2020 | Erb | H04L 9/0841 |

FOREIGN PATENT DOCUMENTS

| | | | | |
|---|---|---|---|---|
| CA | 3038949 A1 * | 10/2019 | | G06F 40/174 |
| EP | 2723033 A1 * | 4/2014 | | G06F 21/10 |
| WO | 2020046855 A1 | 3/2020 | | |

OTHER PUBLICATIONS

Ofleh, O., "Future of Identity and Access Management: The OpenID Connect Protocol", University of Houston, ProQuest Dissertations & Theses. (2018) (Year: 2018).*
International Search Report and Written Opinion dated Jan. 30, 2023 which was issued in connection with International Application No. PCT/US22/039020. 13 pages.

* cited by examiner

*Primary Examiner* — Clay C Lee
(74) *Attorney, Agent, or Firm* — Buckley, Maschoff & Talwalkar LLC

(57) ABSTRACT

Briefly, embodiments are directed to a system, method, and article for receiving an authorization request message for a remote commerce transaction with a particular merchant, where the authorization request message comprises a merchant universal payment identifier (MuPi). The MuPi may be extracted from the authorization request message. Validation information may be determined for the MuPi. A message may be transmitted to a payment network to enable authorization of the remote commerce transaction at least partially in response to the determination of the validation information.

22 Claims, 5 Drawing Sheets

MERCHANT UNIVERSAL PAYMENT IDENTIFIER SYSTEM

BACKGROUND

Merchants are a key constituent of a commerce ecosystem. However, merchants do not have a clean representation within a transaction system itself. In current transaction systems, there is a gap in terms of security with respect to digital payments. For example, in processing payments for a transaction conducted via remote commerce, e.g., through the Internet or otherwise conducted by a person who is not physically located at a merchant's store or point of sale, there is a potential for fraud or malfeasance relating to the identity of the merchant. For example, current systems generally lack a deterministic understanding of who a payee or merchant is when payment credentials are processed or otherwise determined for a transaction.

In a non-digital or physical scenario, such as where a customer engages in a transaction at a merchant's place of business, a customer may know who is receiving the payment, e.g., the identity of the merchant, because the customer is physically present within the context of the merchant, such as at the merchant's store location or at a particular payment terminal. Moreover, a payment processor, e.g., an entity who handles fulfillment of payment for a transaction, may know deterministically who is being paid because a terminal identifier corresponding to a terminal on which payment is initiated is deterministic from the perspective of a payment processor. In other words, if a customer engages in a payment via a credit card or digital wallet at a payment terminal at a merchant's point of sale, a payment processor may be capable of readily determining who the merchant is based, e.g., on a terminal identifier associated with the payment terminal.

With some transaction systems, however, there is less certainty with respect to an identity of a merchant for remote commerce transactions, such as those made via the Internet on a particular website. For example, even if a merchant is associated with a merchant identifier for a remote commerce transaction, there is a possibility that the merchant identifier is fraudulent so that payment may potentially be made to an entity other than the correct merchant. Moreover, it may not be possible, for example, to provide enhanced security and assurance for remote commerce payments by binding tokens to particular merchants.

When the same transactions shift from a physical world to a digital world, such as where payment credentials are generated from a digital wallet, via a Secure Remote Commerce (SRC) application, or from some other current file type functionality, a payment processor may only have a superficial knowledge of who the merchant is. For example, in current systems, there is no deterministic way of knowing a true identity of a merchant. Accordingly, if a payment credential is utilized to generate a token, there is no check or balance during a second leg of a transaction from a payment network perspective. For example, in the cloud token world, a generated token may potentially be taken and used elsewhere for fraudulent activities. There may not be intelligence about the merchant that may be created and/or shared with issuers to provide a system with an ability to get smarter in order to perform risk-based analytics or analysis so as to provide higher approval rates and/or reduce risk.

Different payment networks have worked on defining an identity of merchants via an "acceptorid" concept. For example, an "acceptorid" may comprise a unique merchant account identifier, such as a Merchant ID. However, an issue with the "acceptorid" concept is one of fragmentation, such as where the acceptorid is unique to each payment network and merchants have to use different merchant identifiers for different payment networks.

SUMMARY

According to an aspect of an example embodiment, a method may be performed at a server, where the method comprises receiving an authorization request message for a remote commerce transaction with a particular merchant. The authorization request message may comprise a merchant universal payment identifier (MuPi). The MuPi may be extracted from the authorization request message and validated. The remote commerce transaction may be authorized in response to the validation of the MuPi. A message may be transmitted to an issuer server to indicate that the transaction has been authorized.

According to an aspect of another example embodiment, a server may include a receiver, a processor, and a transmitter. The receiver may receive an authorization request message for a remote commerce transaction with a particular merchant. The authorization request message may comprise a MuPi. The processor may extract the MuPi from the authorization request message, validate the MuPi, and authorize the remote commerce transaction in response to the validation of the MuPi. The transmitter may transmit a message to an issuer server to indicate that the remote commerce transaction has been authorized.

According to an aspect of an additional example embodiment, a method may be performed at a merchant device. The method may include registering a MuPi with an Authorized Merchant Registrar (AMR). A JavaScript Object Notation (JSON) Web Token (JWT) may be received from the AMR. A merchant manifest may be generated. The merchant manifest may comprise the JWT. The merchant manifest may be stored at a particular Uniform Resource Locator (URL) address.

According to an aspect of further example embodiment, a merchant device may be provided. The merchant device may include a transmitter, a receiver, and a processor. The transmitter may transmit a first message to an AMR. The first message may comprise a request to register a MuPi with the AMR. The receiver may receive a second message from the AMR, wherein the second message comprises a JWT. The processor may generate a merchant manifest. The merchant manifest may comprise the JWT. The processor may also initiate storage of the merchant manifest at a particular URL address.

According to an aspect of another embodiment, an article may be provided which includes a non-transitory storage medium comprising machine-readable instructions executable by one or more processors. The machine-readable instructions may be executable to register a MuPi with an AMR and process a received JWT from the AMR. The machine-readable instructions may be further executable to generate a merchant manifest, where the merchant manifest comprises the JWT. The machine-readable instructions may also be executable to initiate storage of the merchant manifest at a particular URL address.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will

Figure 1:
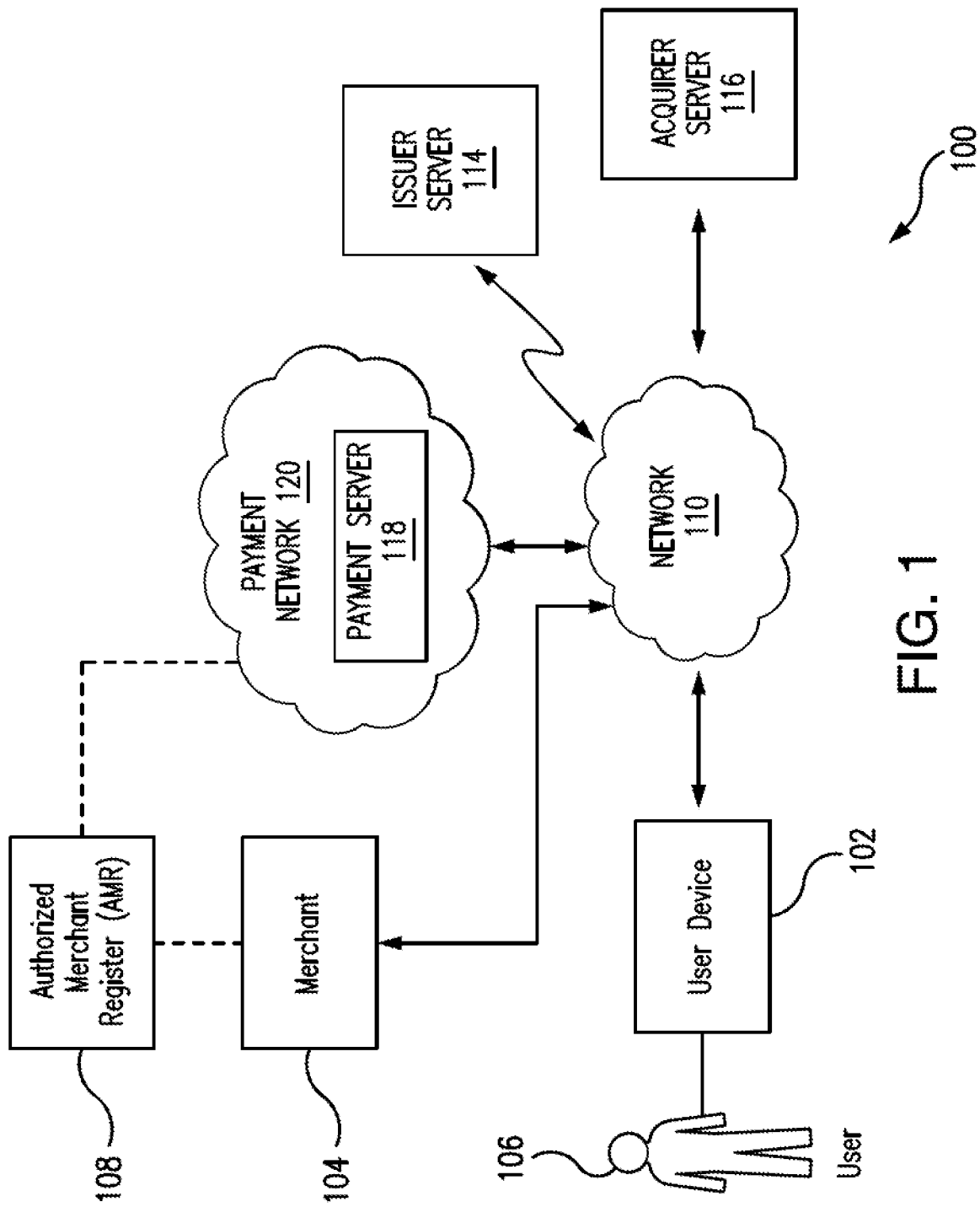
FIG. 1 illustrates an example representation of an environment in which at least some example embodiments may be implemented.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

One or more embodiments, as discussed here, related to a universal identifier for a merchant for use in a remote commerce or ecommerce environment. For example, one or more embodiments define a solution for merchants which utilize the Internet or the web for commerce, including merchants who have web, mobile, and/or Internet of Things (IoT) commerce applications. These merchants may also utilize one or more web servers which may enable these remote commerce activities.

Some embodiments allow accurate identification of the identity of a merchant which whom a consumer is interacting in a particular transaction. This accurate identification allows different fraud models to be implemented based on the identity of the merchant. Accordingly, if a deterministic understanding of the merchant may be made, then behavioral and/or heuristic analytics on a user device may be combined for a relatively strong risk profile.

Pursuant to some embodiments, a system of issuing and validating a payment identifier for merchants is provided such that the merchant payment identifier is universally unique and is available in transactions involving the merchant including in remote commerce and payment message transactions. Such a merchant payment identifier is referred to herein as a "merchant universal payment identifier" or "MuPi". As used herein, the term MuPi refers to a payment identifier for a merchant that is issued and used pursuant to the present invention. A MuPi may be used in payment systems including open loop payment systems where a payment may be made via multiple different payment sources or networks as a means to uniquely and verifiably identify the merchant. While further details of a MuPi will be described elsewhere herein, in general, a MuPi may comprise a cryptographically verifiable identifier that is associated with a specific merchant. The MuPi may be utilized for subsequent correlation/linking between a digital authentication and payment authorization transactions involving the merchant. Pursuant to some embodiments, a MuPi may comprise two components—a link-based Merchant Identifier and a manifest file deployed at that link. For example, the link for a MuPi may comprise a network link, such as a Uniform Resource Locator (URL) link.

In accordance with one or more embodiments, web-commerce enabled merchants may have a web domain that they own and have access to web infrastructure. These merchants, therefore, utilize a URL of their domain as their identifier in the format similar to what is described in World Wide Web Consortium (W3C)'s URL-based Payment Method Identifiers. Any valid URL within their domain may be used as the network link for the Merchant Identifier (and also the location at which the manifest file is deployed). For example, the network link and location of the manifest file for a merchant named "Merchant" may be, e.g., https://merchant.com/mupi.

Embodiments of the present invention may be used with desirable results in remote transactions involving a merchant and customers in which transactions are conducted using payment processes such as the Secure Remote Checkout ("SRC") process defined by the EMV Specifications available at https://www.emvco.com/emv-technologies/src/. For simplicity and ease of exposition, embodiments of the present invention will be described herein in reference to transactions that generally follow the SRC process. However, those skilled in the art, upon reading this disclosure, will appreciate that embodiments of the present invention may also be used in more traditional remote checkout transactions (e.g., where a customer enters their payment information in a checkout page hosted by or on behalf of a merchant).

There are many features of one or more embodiments comprising a MuPi. For example, a merchant may create a MuPi one time, such as directly with an approved network service provider, through Secure Remote Commerce (SRC) systems or through an "Authorized Merchant Registrar" (AMR) approved by a payment network as described further herein (e.g., as described in conjunction with FIG. 2). This single MuPi can be used for a merchant with all payment networks, acquirers, and/or SRC-powered Checkout Providers. For tokenized transactions, a MuPi may be bound to a payment credential, thereby significantly enhancing security of the transaction. Know Your Customer (KYC)/Anti-Money Laundering (AML) responsibility, in this model, may remain with the acquirers (the financial institutions or other entities that contract with merchants to perform the function of acquiring the merchant transactions and submitting those transactions to the payment networks for processing).

A MuPi may provide a number of benefits to merchants that use them. For example, a MuPi may be used in all remote commerce transactions powered by an SRC system. A MuPi may provide for highly secure MuPi bound payment credentials for higher approval rates and a potential of a liability shift from the merchants. A MuPi may also provide assurances such as that no malicious player may have an ability to hijack a merchant's payment credentials for their benefit.

A MuPi may also provide various benefits to remote commerce providers. For example, a MuPi may provide reputable commerce platforms which may register as AMRs to provide this enhanced service to their merchants. Checkout providers may provide checkout capabilities without risk of credential compromise or harvesting.

To facilitate description and understanding of features of some embodiments, a brief illustrative transaction example will now be introduced, and which will be subsequently used to describe features of the present invention. In the example, a customer (or "user") operates a computing device to browse a merchant's e-commerce website. The user selects to purchase an item from the merchant and interacts with the e-commerce website's checkout pages to select a payment method and to "checkout" and purchase the item by authorizing the merchant to charge or debit the payment method for the amount of the purchase. In the example, the user uses a credit card to make the purchase, and the credit card has previously been registered with the SRC system (so the user does not have to enter all the credit card details in the checkout pages—instead, some or all of the credit card details are retrieved from the SRC system).

In the illustrative example, the merchant's website uses a checkout page that is in communication with the SRC system and that also is configured to interact with a merchant acquirer as described further herein. Embodiments may be used in conjunction with any acquirer that is able to process SRC or remote commerce transactions. Further, in the illustrative example, the merchant has registered to participate in the system of the present invention (that is, the merchant has been issued a MuPi, including a network identifier and a manifest pursuant to the present invention, e.g., as described in conjunction with the process shown in FIG. 3). The merchant's MuPi has been provided to the merchant by an authorized merchant registrar (e.g., as shown in the process described in FIG. 2). Further, in the example, a payment network operated by Mastercard International Incorporated is used to process the payment transaction and to also validate the merchant's identity.

In the illustrative example, the transaction proceeds as follows. The user interacts with the checkout page and submits the transaction for processing. The checkout page (or other code associated with the merchant website) passes information about the transaction (including the MuPi) to the payment network so that the network can validate the merchant's identity. If the merchant's identity is validated, the transaction continues and the merchant website causes a payment authorization request message (e.g., such as an 0100 message of ISO 8583) to be submitted to the payment network for authorization processing (e.g., using a process such as the process described in conjunction with FIG. 4). Pursuant to some embodiments, the validation of the merchant identity is performed substantially in conjunction with standard SRC processing (e.g., in an interaction between the checkout pages and the SRC payment server 118 where the checkout pages request the user's credit card information from the SRC system). As a result, the number of messages required to implement features of the present invention are reduced.

Features of some embodiments will now be described by first referencing FIG. 1 which illustrates an example representation of an environment 100 in which at least some example embodiments may be implemented. Environment 100 may include a user device 102. For example, a user 106 may utilize user device 102 to purchase goods and/or services from a merchant 104. User 106 may access a website or merchant interface for the merchant 104 via user device 102. In accordance with an embodiment, such a website may comprise a digital interface or an interaction channel associated with merchant 104 for selling goods and/or services or any offerings which may require a financial transaction with the customers such as the user 106. Such a website may be hosted on a remote web server (not shown) and may retrieve one or more web pages from a remote web server over a network 110 upon navigation through the website. As described above, the website may include or be associated with one or more checkout pages that facilitate purchase transactions. In some embodiments, the checkout pages may interact with a remote payment server 118 to perform SRC processing.

User device 102 of FIG. 1 may comprise a computing device having the capability to communicate with other devices via network 110. Network 110 may comprise the Internet in one or more embodiments. Examples of user device 102 include, but are not limited to, a smartphone, a tablet, a laptop, a desktop computer, a personal digital assistant (PDA), or a notebook, to name just a few examples among many.

User device 102 may access a remote commerce or e-commerce website managed by merchant 104. User 106 of user device 102 may have one or more payment accounts (such as debit or credit card accounts) issued by one or more financial institutions or "issuers". As described in the illustrative example introduced above, the user participates in the EMV SRC system (and has registered one or more of the payment accounts with an SRC provider such as the payment server 118 associated with the payment network 120).

A payment transaction between the user 106 and the merchant 104 may be facilitated by the server system and a payment network 120. Examples of the server system may include an issuer server 114, an acquirer server 116, and a payment server 118. In some cases, the issuer server 114, the acquirer server 116, and the payment server 118 may comprise a single entity, or any two of these servers may comprise a single entity. In general, a payment transaction between the user operating the user device 102 and the merchant 104 involves the user interacting with a checkout page associated with the merchant 104, the checkout page interacting with the payment server 118, and a transaction authorization request being issued by an acquirer server 116 associated with the merchant 104. The authorization request is routed through the payment network 120 to the issuer server 114 for authorization processing. In some embodiments, the payment network 120 may stand in for the issuer server 114 to conduct the authorization processing on behalf of the issuer. Pursuant to some embodiments, some aspects of this standard payment transaction flow are enhanced due to the use of a MuPi that is used to identify the merchant 104.

Figure 3:
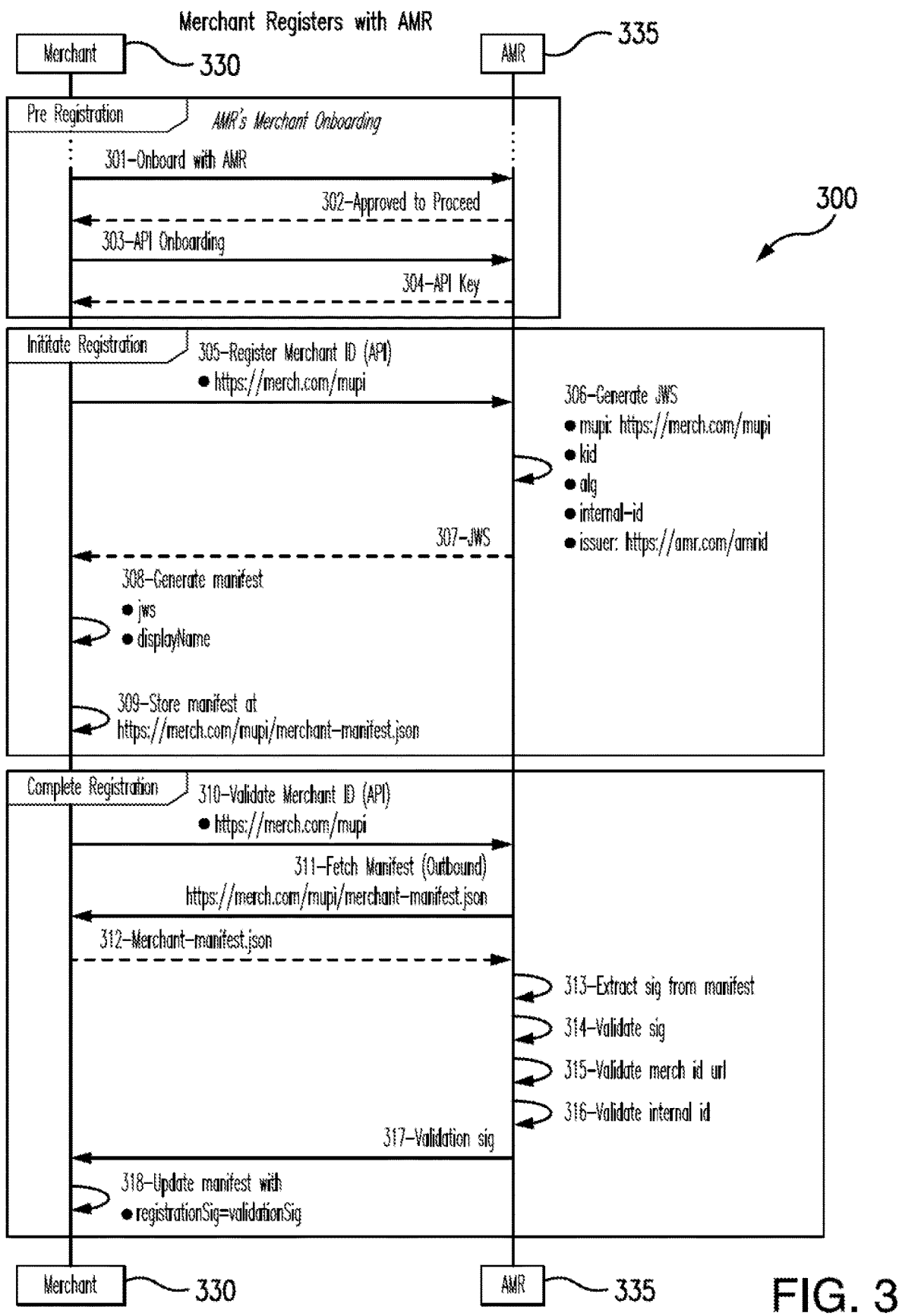
FIG. 3 is a flow diagram of an embodiment of a process for a merchant to register with an AMR.

Pursuant to some embodiments, the merchant 104 may obtain a MuPi by interacting with an authorized merchant register ("AMR") 108 (e.g., as described in further detail in conjunction with FIG. 3). In environment 100, a merchant 104 may be registered with an AMR 108. For example, prior to engaging in a transaction with user 106 of user device 102, merchant 104 may register with AMR 108 to obtain a MuPi.

Figure 2:
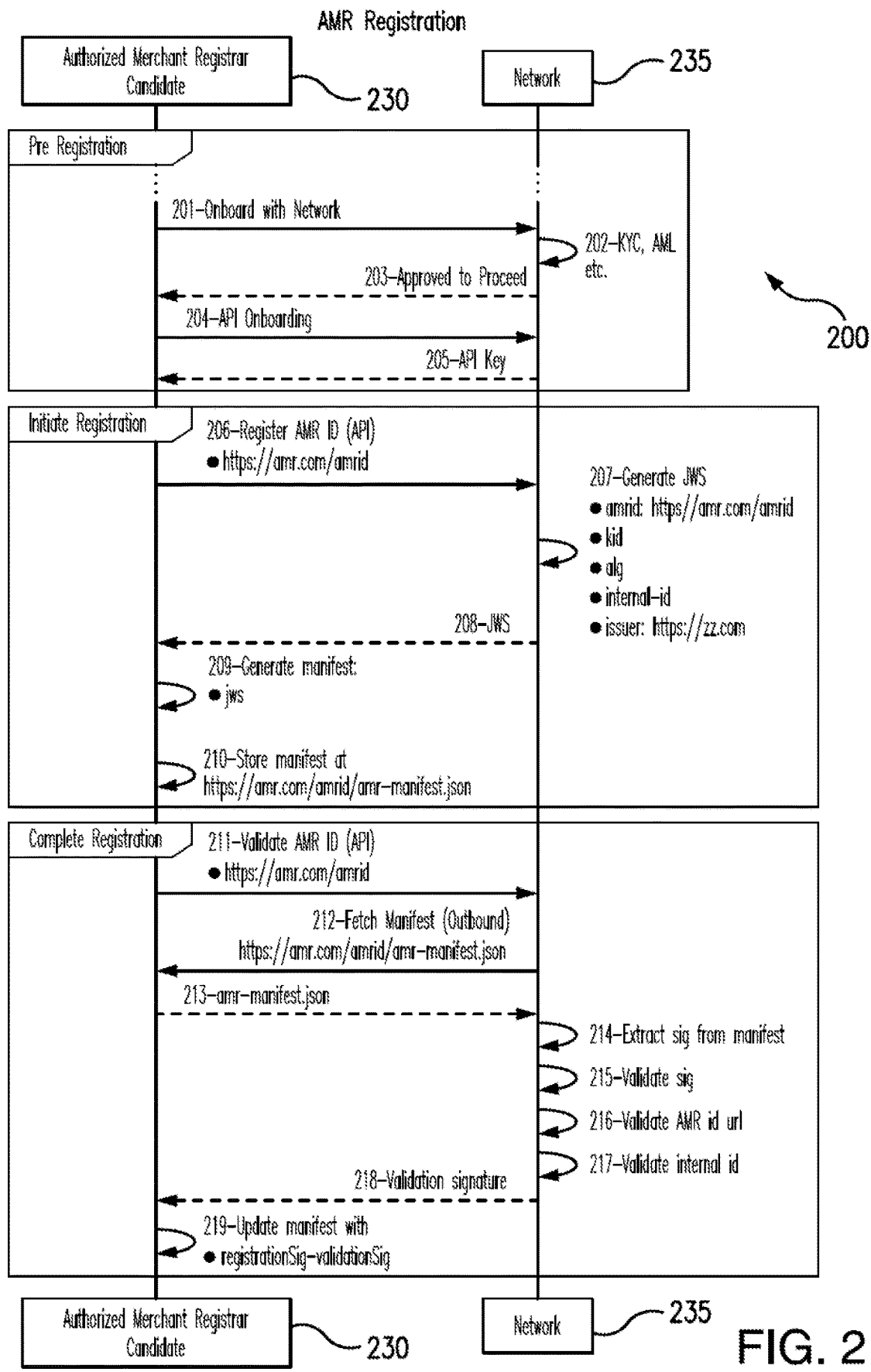
FIG. 2 is a flow diagram of an embodiment of a process for registering an Authorized Merchant Registrar (AMR) Candidate.

A merchant 104 may provide certain identifiable credentials to AMR 108 in order to obtain the MuPi. For example, merchant 104 may provide information such as information relating to security infrastructure, KYC, anti-money laundering, and other information to indicate a scale of the merchant's transactions or processing needs or merchant relationships. A process for a merchant to register with an AMR 108 is discussed in more detail below with respect to FIG. 3. Pursuant to some embodiments, the AMR 108 may be accessible by payment network 120. For example, in order to become an authorized AMR, the AMR 108 may interact with the payment network 120 as shown in FIG. 2.

The acquirer server 116 may be associated with a financial institution such as an "merchant bank" or the "acquiring bank" or "acquirer bank" or simply "acquirer", in which the merchant (or a beneficiary) may have account. The acquirer server 116 may be associated with the acquirer bank. In an embodiment, the environment 100 may include a plurality of acquirer servers and a plurality of acquirers associated with the one or more merchants. Similarly, the environment 100 may include a plurality of issuer servers associated with a plurality of issuers, wherein the user 106 may have financial accounts at one or more of the issuers. The payment server 118 may be associated with payment network 120 such as the Banknet network operated by Mastercard International Incorporated.

The payment server 118 may be configured to perform SRC processing as described in the EMV SRC specifications referenced above and may interact with user devices, merchant checkouts and acquirers to facilitate SRC transaction processing pursuant to those specifications and further pursuant to the present invention. In an example embodiment, one or more of the merchant 104, the user device 102 and an acquirer server 116 may be equipped with an instance of an application that allows the device to interact with the SRC payment server 118. installed therein. A similar or complimentary application and its components may reside within payment server 118. The application may comprise a set of computer executable codes configured to perform one or more methods disclosed herein. The set of computer executable codes may be stored in a non-transitory computer-readable medium of the user device 102, the merchant 104, the acquirer server 116 or the SRC payment server 118. The application may be extended as a security Application Programming Interface (API) (such as Mastercard security API). Each of the devices may communicate with the payment server 118 through the application. In other words, the application installed on a device such as the user device 102 may facilitate an application interface to enable communication of the user device 102 with the other devices or the server system (e.g., the payment server 118 and the issuer server 114).

The user device 104, the merchant 104, the issuer server 114, the acquirer server 116 and the payment server 118 may communicate with one another using the network 110. Examples of the network 110 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 110 may comprise or include the Internet, intranets, extranets, microwave networks, satellite communications, cellular systems, personal communication services ("PCS"), infrared communications, global area networks, or other suitable networks, etc., or any combination of two or more such networks.

In previous digital or electronic payment transactions, an identifier of a merchant, e.g., a MerchantID, may have been used. However, the identity of the merchant not actually authenticated or validated during the electronic transaction.

Pursuant to the SRC specifications, when a consumer interacts with a checkout page and selects to use a payment card pursuant to the SRC system, an SRC server acts to generate a payment credential for the transaction. However, in prior systems, there was no way to know with certainty whether the merchant is a legitimate merchant or the merchant that the user intends to transact with. Unfortunately, a third party with deceptive intent, may take advantage of this deficiency For example, there are no checks and balances in current systems and the two legs of the transaction do not communicate with each other in a way which could allow a deceptive merchant to be identified. Even if some kind of identifier were extracted from the first leg of the transaction and injected into the second leg of the transaction, since the data is being injected from the original digital transaction, there is no correlation between the two legs other than the information generated initially. Accordingly, there is no verification of any information which is independent of any data generated during the processing of the two legs of the transaction.

A further problem with current transaction or payment systems is that there is generally a very high lift/heavy lift investment required from the merchant community in order to create identifiers with multiple payment networks and with potentially multiple PSPs. For example, each payment network may utilize its own identifiers to attempt to provide its own value-added service. For example, there is no current open loop system where a single identifier for a merchant may be utilized with different payment networks.

However, pursuant to the present invention, the use of a MuPi as described herein reduces the barriers to creating, issuing and using these merchant identifiers. For example, a merchant may already have a relationship with an entity within the commerce ecosystem that is qualified to issue MuPis pursuant to the present invention. For example, the merchant may go to that entity within the ecosystem to generate an identifier that is universal across the payment ecosystem. As an example, the merchant may obtain a MuPi from a particular payment network and may subsequently use that MuPi for transactions via other payment networks. In other words, a MuPi which comprises a universal identifier may be utilized to accurately verify the identity of the merchant for multiple different payment networks instead of being limited to a single payment network.

If, for example, a particular merchant has relationship with an acquirer (such as Worldpay™) the merchant could go and register itself with Worldpay™ to generate and acquire a MuPi. The MuPi may subsequently be valid across other payment networks and across other commerce ecosystems and PSPs and with other acquirers and issuers, for example.

Use of a MuPi provides a deterministic solution. The deterministic aspect of a MuPi stems, e.g., from the fact that the universe of merchants who would be eligible for using a MuPi are those who have some type of web presence in the first place. This universe covers potentially 80-90% of all transactions globally. In accordance with one or more embodiments, a determination may be made as to the identify of a merchant associated with a particular transaction. By identifying the identity of the merchant prior to enabling a payment network to authorize a transaction, for example, potential incidents of fraud may be reduced, for example. For example, by implementing such a deterministic solution, the chance of fraud may be greatly reduced resulting in a higher level of confidence that a transaction with a merchant is authentic.

One component of an environment 100 of the present invention is the authorized merchant registrar or "AMR" 108. A number of AMRs 108 may be provided in an environment, and any reputable payments ecosystem participant with a strong web presence may become an AMR. Typical candidates include Commerce Platforms, Checkout Providers and payment service providers. For example, an embodiment of a process for registering an Authorized Merchant Registrar (AMR) 108 with a payment network 120 is discussed in detail below with respect to FIG. 2.

In some embodiments, candidates that wish to become an AMR 108 must onboard themselves with a payment network 120 (or another entity such as an SRC system or platform). A payment network 120 may be responsible to ensuring that an AMR candidate is a reputable entity with strong security infrastructure and, in general, has the scale/merchant relationships necessary to be an AMR 108. A payment network 120 may onboard a candidate onto its infrastructure and enable the candidate to operate as an AMR 108 and to make client-authorized API calls. A candidate that is approved may designate a URL to use as its AMR Identifier, such as https://amr.com/amr/amrid. The candidate may call a payment network API with this identifier to retrieve a signature. The candidate may put that signature inside an AMR manifest file at the identifier URL. The candidate may call the payment network API to validate the identifier. The payment network 120 may validate the signature at the identifier URL. The payment network 120 may generate a validation signature and return the validation signature to the candidate. The candidate may replace a current registration signature with a validation signature returned by the payment network 120. The candidate may subsequently become an AMR 108 and may therefore be ready to onboard potentially hundreds of thousands of merchants 104 onto the MuPi system of the present invention.

FIG. 2 is a flow diagram of an embodiment 200 of a process for registering an Authorized Merchant Registrar (AMR) Candidate 230 to become an AMR. For example, an AMR Candidate may be registered with a network 235, such as a payment network, or with an entity which processes payments. Embodiments in accordance with claimed subject matter may include all of, less than, or more than operations 201 through 219. Also, the order of operations 201 through 219 is merely an example order.

A way to become a merchant registrar is by having an AMR identifier. For example, an AMR Candidate 230 may have a cryptographically signed identifier at a predefined location on the web which is controlled by the AMR Candidate 230 and which is defined by a unique URL. Within the URL, based on exchange of keys, e.g., there may be a signature from a network 235 or a payment processor attesting to the AMR Candidate's 230 validation as a provider of registration services for merchants.

As illustrated, embodiment 200 includes operations relating to pre-registration, the initiation of registration, and operations to complete the registration. For example, during pre-registration, operations 201 through 205 may be performed. During the initiation of registration, operations 206 through 210 may be performed. During the completion of registration, operations 211 through 219 may be performed.

At operation 201 an AMR Candidate 230 may onboard with a payment network 235 or other entity authorized to perform AMR registration pursuant to the present invention. In some embodiments, the network 235 uses a public key infrastructure to generate signatures and to validate signatures in process 200, although other cryptographic schemes may also be used. During a pre-registration process, in some embodiments, an AMR candidate 230 may upload file(s) or otherwise supply information required by a network 235, such as an identification of a particular domain on which to operate.

At operation 202, various security checks or processes may be performed based on the information onboarded at operation 201. For example, Know Your Customer (KYC) and Anti-Money Laundering (AML) security checks may be performed to verify, for example, that the AMR candidate is a reputable entity with a strong security infrastructure and the scale/ability to function as an AMR.

At operation 203, the AMR Candidate 230 may be approved to proceed. At operation 204, an API onboarding process may be performed. At operation 205, an API key may be transmitted from network 235 to the AMR Candidate 230. That is, at 205, the AMR candidate 230 is granted permission and access to interact with the network 235 via (as an example) an API.

At operation 206, the AMR candidate 230 provides the network 235 with an AMR identifier (ID) for registration with the network 235. For example, an AMR ID may comprise a URL such as "https://amr.com/amrid".

At operation 207, a JavaScript Object Notation (JSON) Web Signature (JWS) token (JWT) may be generated by the network 235. A JWT represents content secured with digital signatures or Message Authentication Codes (MACs) using JSON-based data structures. The JWT may include information such as the AMR ID (e.g., "https://amr.com/amrid"), a key ID (kid), an algorithm (alg), an internal-id, and information associated with the issuer of the JWT, such as a website for an issuer, such as https://zz.com for a particular issuer. The signature generated at 207 is provided to the AMR candidate 230 at 208.

At operation 208, the JWT may be transmitted from network 235 to AMR Candidate 230. At operation 209, the AMR candidate 230 operates to put the received signature inside the amr-manifest file at the identified file location. The manifest file may include the signature as well as various other preferences. At operation 210, the AMR Candidate manifest may be stored at a particular URL or web address such as https://amr.com/amrid/amr-manifest.json.

At operation 211, the AMR candidate 230 calls the API with a request to validate the AMR identifier For example, the AMR ID may comprise a URL such as https://amr.com/amrid. At operation 212, the network 235 responds to the request by fetching the manifest. For example, the outbound manifest may be obtained from a website URL, such as https://amr.com/amrd/amr-manifest.json. At operation 213, the manifest, amr-manifest.json, may be provided to the network 235.

At operation 214, network 235 may extract a signature from the manifest. At operation 215, the signature may be validated by the network 235. At operation 216, the merchant ID URL may be validated by the network 235. At operation 217, the internal ID may be validated. At operation 218 a validation signature may be transmitted to the AMR Candidate 230. At operation 219, the manifest may be updated so that the registration signature, registrationSig, for the manifest is the validation signature, validationSig. At this point, the entity can operate as an AMR 108 and can act to issue MuPis to merchants 104 and can also participate in transactions pursuant to the present invention. In some embodiments, AMRs 108 may be reviewed periodically to confirm they are still entitled to act as an AMR 108 in the system of the present invention.

Now, merchants 104 may interact with the AMR 108 to obtain a MuPi. Pursuant to some embodiments, a single MuPi issued by an AMR 108 may serve to identify the merchant 104 across a variety of different payment networks. As discussed above, a MuPi may comprise a combination of a URL and a manifest. A MuPi may be registered within a digital payments ecosystem with ease. As discussed above, a MuPi may be registered either directly with payment networks, an SRC-System, or with an AMR. In general, a process for a merchant 104 to register the MuPi has two primary steps, e.g., first register the MuPi with either a payment network 120 or an AMR 108, and then update acquirers 116 with the newly minted MuPi. Once a merchant 104 has successfully performed these two steps, the merchant 104 may be ready to use its MuPi with its remote commerce transactions.

Registering the MuPi, as a process, is similar to the AMR registration process 200 as discussed above with respect to FIG. 2. For example, merchants 104 may onboard themselves with a payment network 120 or with an AMR 108. The merchant 104 may designate a URL that it owns as its MuPi URL, such as https://merchant.com/mupi, for example. The merchant 104 may subsequently call the AMR API with this identifier to retrieve a signature. The merchant 104 may insert this signature inside a merchant manifest file at the MuPi URL.

The merchant 104 may call the AMR API to validate the MuPi. The AMR 108 may validate the signature at the MuPi URL. The AMR 108 may also generate a validation signature and return this validation signature to the merchant. The merchant 104 may replace the registration signature with the validation signature returned by the AMR 108. At this point, the merchant 104 may be ready to use the MuPi in its remote commerce transactions. To receive this benefit, for example, the merchant 104 would have to update its acquirer servers 116 with the MuPi. The MuPi may also be registered with an SRC System such as the SRC payment server 118.

The amount of data/content which is provided in a MuPi is up to the merchant 104. The bare minimum may comprise the MuPi itself, which may be a hashed identifier. A merchant 104 may take steps to ensure that its acquirers have the MuPi available to them. For example, if Bank of America™ is a particular merchant's acquirer 118, the merchant 104 may go to Bank of America™ (or Paypal™) and may inform the acquirer 118 who the merchant 104 is and information the AMR 108 that it is associated with this particular MuPi. The acquirer 118 may validate that this is relevant based on cryptographic information plus what the acquirer 118 already knows about the merchant 104 based on the KYC. The acquirer's job, during a transaction/authorization flow, is to inject the MuPi into an 0100 authorization request message.

For example, the acquirer may utilize the terminal ID field in an 0100 message to inject the MuPi after having authenticated the merchant 104. An acquirer may swap a terminal ID field with the MuPi in accordance with an embodiment.

One or more embodiments as discussed here are useful for all digital transactions where a payment credential is generated on a digital flow and is then sent to an authorization flow separately. In other words, authentication and authorization flows are separated.

As discussed above, a MuPi has two components or parts, e.g., a URL-based Merchant Identifier and a manifest file deployed at that URL. The merchants, therefore, utilize a URL of their domain as their identifier in the format similar to what is described in W3C's URL-based Payment Method Identifiers. Any valid URL within their domain can be used as an identifier for the merchant, such as https://merchant.com/mupi, for example.

The URL identifier may be utilized to host a manifest file that will provide certain rigor (and additional details) to an identification. In accordance with an embodiment, merchants may host a manifest file at <merchant-identifier-url>/merchant-manifest.json, for example. An example of a merchant manifest file is shown below. In the example, the AMR that issued the MuPi is Google, and the manifest references two Digital Payment Application ("DPA") domains (which may be used in accordance with the SRC specifications referenced above to conduct SRC transactions). The manifest shown below has a registrationSignature that may be validated by a network (or other entity) to validate that the merchant identifier is valid. Other details may be provided in the manifest to provide additional information about merchant (such as, for example, information about the merchant type).

```
merchant-manifest.json
{
    "registrationSignature": "adfvadfvadfvadfvadfv==",
    "registrationProvider": "https://google.com/pay",
    "providerType":
    "displayName": "Merchant Display Name"
    "dpaDomains":[
        "https://dpa1.com",
        "https://dpa2.com"
    ]
}
```

FIG. 3 is a flow diagram of an embodiment of a process 300 for a merchant 330 to register with an AMR 335. Embodiments in accordance with claimed subject matter may include all of, less than, or more than operations 301 through 318. Also, the order of operations 301 through 318 is merely an example order.

As illustrated, process 300 includes operations relating to pre-registration, the initiation of registration, and operations to complete the registration. For example, during pre-registration, operations 301 through 304 may be performed. During the initiation of registration, operations 305 through 309 may be performed. During the completion of registration, operations 310 through 318 may be performed.

From a merchant's perspective, the merchant 330 may go to an AMR 335 to register itself. For example, the merchant 330 may inform the AMR 335 that it is "momandpop.com" may provide its identifier, e.g., momandpop.com/MuPi as its identifier. At operation 301, a merchant 330 may onboard with an AMR 335, e.g., such as Stripe™. For example, during an onboard process, a merchant 330 may upload file(s) or otherwise supply information required by AMR 335. The AMR 335 may generate a signature/identifier for the merchant 330 which the merchant may place at a predefined location within its web service and a validation flow may be executed with an entity such as Stripe™.

At operation 302, the merchant 330 may be approved to proceed. At operation 303, an API onboarding process may be performed. At operation 304, an API key may be transmitted from AMR 335 to the merchant 330.

At operation 305, a merchant ID may be registered with AMR 335 for merchant 330. For example, a merchant ID may comprise a URL such as "https://merch.com/mupi". At operation 306, a JWS may be generated by the AMR 335. The JWS may include information such as the MuPi (e.g., "https://merch.com/mupi"), a kid, an alg, an internal ID, and information for an issuer, such as a website for an AMR, such as https://amr.com/amrid.

At operation 306, the AMR 335 may fetch information from the location received at operation 305 from the merchant 330, e.g., https://merch.com/mupi, and may validate the merchant based on information which was provided earlier plus what the AMR 335 knows about the merchant 330 from a previous KYS service. The AMR 335 may combine information from these two sources and may create a validated JavaScript Object Notation (JSON) Web Token (JWT). A JWT is a compact, URL-safe means of representing claims to be transferred between two parties. The claims in a JWT are encoded as a JSON object that is used as the payload of a JWS structure or as the plaintext of a JSON Web Encryption (JWE) structure, enabling the claims to be digitally signed or integrity protected with a Message Authentication Code (MAC) and/or encrypted.

A JWT may comprise the merchant manifest kept at a predefined location. So whomever wants to deal with merchant 330 after it is registered with the AMR 335 within the payments ecosystem is going to indicated that its MuPi is momandpop.com/MuPi and whomever is dealing with it is going to extract the manifest from there which is a JWT. A JWT may comprise a compact URL-safe means of representing claims to be transferred between two parties. The claims in a JWT may be encoded as a JSON object which is digitally signed using a JWS. The tokens may be signed by one party's private key (usually the server's), so that both parties (the other already being, by some suitable and trustworthy means, in possession of the corresponding public key) are able to verify that the token is legitimate. The tokens are designed to be compact, URL-safe, and usable especially in a web-browser single-sign-on (SSO) context. JWT claims may often be used to pass identities of authenticated users between an identity provider and a service provider, or any other type of claims as required by business processes.

At operation 307, the JWS may be transmitted from AMR 335 to merchant 330. At operation 308, a merchant manifest may be generated for the merchant which may include the JWS, a displayName field indicating a name of the merchant, as well as various other preferences. At operation 309, the merchant manifest may be stored at a particular URL or web address such as https://merch.com/mupi/merchant-manifest.json.

At operation 310, a merchant ID (API) may be validated. For example, the merchant ID may comprise a URL such as https://merch.com/merid. At operation 311, an outbound manifest may be fetched. For example, the outbound manifest may be obtained from a website URL, such as https://merch.com/mupi/merchant-manifest.json. At operation 312, the manifest, e.g., merchant-manifest.json, may be provided to the AMR 335.

At operation 313, the AMR 335 may extract a signature from the merchant manifest. At operation 314, the signature may be validated by the network 335. At operation 315, the merchant ID URL may be validated by the network 335. At operation 316, the internal ID may be validated. At operation 317 a validation signature may be transmitted to the merchant 330. At operation 318, the manifest may be updated so that the registration signature, registrationSig, for the manifest is the validation signature, validationSig.

When a network is generating a payment credential for a transaction relating to the merchant 330, for example, a payment network may have the merchant's 330 MuPi at the time when the payment credential is generated. The network may cryptographically validate that the MuPi has been minted by an authorized AMR 335 and, if so, the network may burn the MuPi into its cryptogram or may otherwise keep a reference of the MuPi against the cryptogram that the network has generated. Accordingly, the next time an authorization transaction is processed for the merchant 330, during its authorization flow, the network may deterministically determine whether a terminal ID received belongs to the same merchant for whom the payment credential was generated in the first place. During this process, e.g., where binding of the MuPi into its cryptogram occurs, two particular benefits may be realized. First, transaction integrity may be maintained at 100%, for example. Second, the network may provide, or an issuer may already have, a lot more context around the merchant 330 than the issuer could have had without considering the MuPi. Because the process is deterministic in both legs, e.g., when the issuer received the MuPi, the issuer may see or have access to a history of the merchant or the merchant's website, momandpop.com, e.g., or the risk profile that was received for them during previous transactions, including information such as how many frauds, how many chargebacks, how many anomalies within that systems, to name just a few examples. The issuer therefore has a fairly decent amount of content which may be used to assess risk and therefore provide authorization for the particular transaction. Accordingly, by using a MuPi as discussed herein with respect to one or more embodiments, authorization rates may increase substantially for good merchants, such as those with a relatively low-risk profile.

Figure 4:
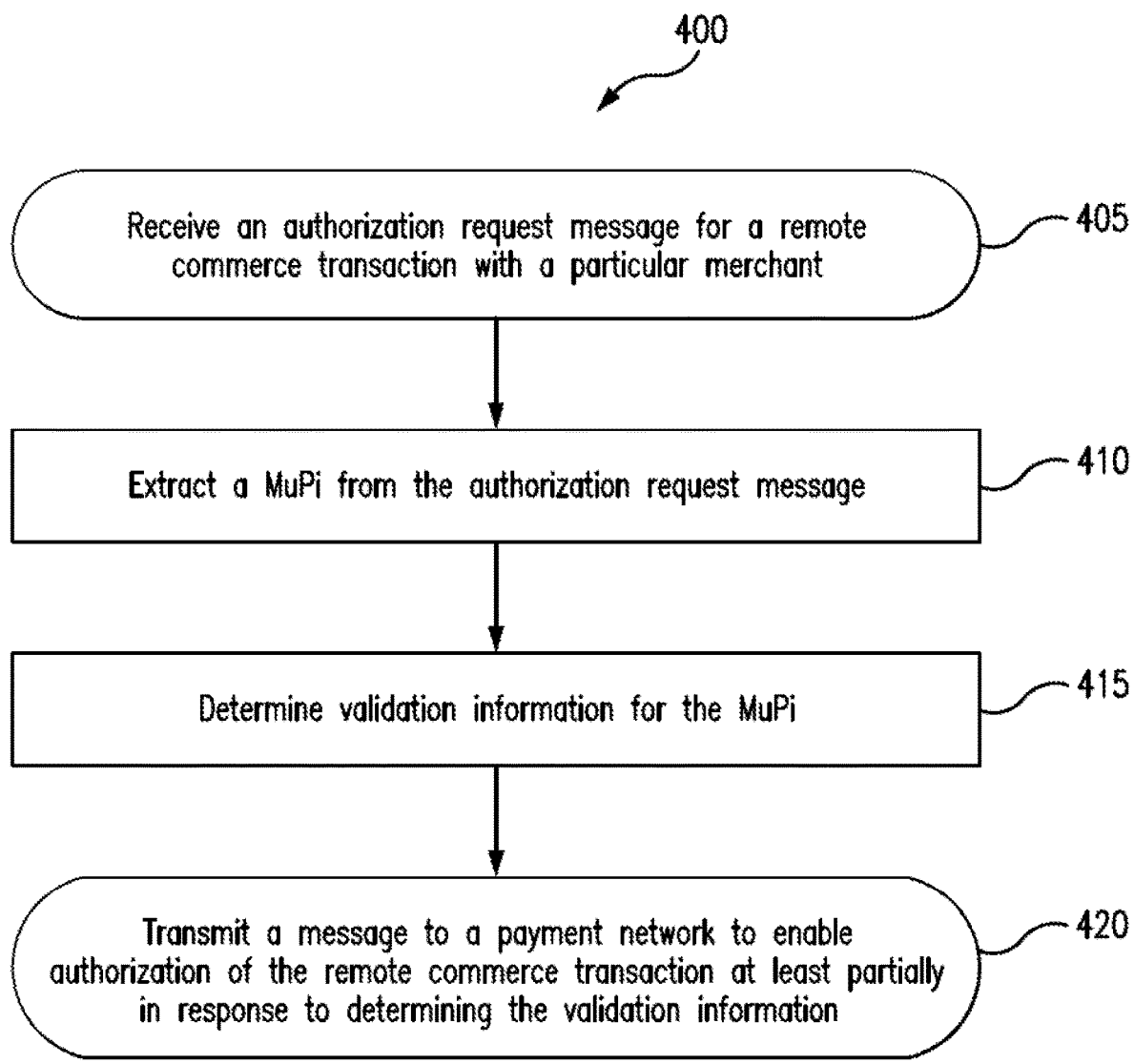
FIG. 4 is a flow diagram of an embodiment of a process for authorizing a transaction.

FIG. 4 is a flow diagram of an embodiment 400 of a process for authorizing a transaction pursuant to some embodiments. Embodiments in accordance with claimed subject matter may include all of, less than, or more than operations 405 through 425. Also, the order of operations 405 through 425 is merely an example order.

At operation 405, an authorization request message may be received for a remote commerce transaction with a particular merchant. For example, the authorization request message may be received by a payment server or payment processing network, for example. In the example transaction introduced above (which is an example of an SRC transaction), several checkout interactions may have taken place to arrive at processing of 405. For example, the user may have selected an item to purchase from a merchant website and the user may have interacted with a checkout page to conduct an SRC transaction. The checkout will pass information associated with the transaction to the SRC system (such as the payment server 118 of FIG. 1). Unlike a prior SRC transaction, processing pursuant to the present invention will include sending the MuPi to the payment server 118. The SRC system will extract the MuPi from the SRC messages, and will extract the merchant manifest.json from the provided URL. The registrationSignature will be extracted from the manifest and the SRC system will inspect the header of the manifest for an "iss" value (which will identify the AMR that issued the MuPi). The SRC system will then extract the amr-manifest.json from the AMR URL and will extract the registrationSignature as well as the "iss" value (which will identify the network as the issuer of the AMR token). Because the network has the key pair that was used to issue the AMR token, the network can validate the AMR's signature using the public key (associated with the "kid" of the AMR manifest). If the AMR is validated, then the network can validate the merchant's registrationSignature using the public key (identified by the "kid" from the AMR). If the merchant's registrationSignature is valid, the merchant is authenticated as a valid merchant within the system of the present invention. The network may also read additional information from the merchant manifest (e.g., such as information about processing options preferred by the merchant, etc.). Once validation is complete, the network and/or the SRC system performs further SRC processing to generate a cryptogram for the customer's payment card (digitalCard in the SRC specifications) using the MuPi. The SRC system or the network may incorporate the MuPi into the cryptogram or save the MuPi in conjunction with the cryptogram for later verification. The cryptogram (and any token) is returned back to the checkout page for further processing to create an authorization request message for the transaction that includes the cryptogram (and any token) as well as the MuPi (and other transaction details such as purchase price, etc.). The authorization request message is transmitted to the payment network as normal.

At operation 410, the MuPi is extracted from the authorization request message. At operation 415, validation information may be determined for the MuPi, e.g., by the payment server or payment processing network accessing a manifest associated with the MuPi and extracting and validating a signature stored therein. For example, the validation information may include a security level indicator indicating a measure of confidence that the particular merchant is valid. In accordance with one or more embodiments, if the measure if confidence is below a particular threshold level, the MuPi may be invalidated. By generating and considering such a measure of confidence, for example, an overall level of fraud may be reduced over time. In some embodiments, the validation information may comprise a binary indicator, such as a logical "pass" or "fail" to indicate whether the merchant associated with the MuPi is likely authentic.

At operation 420, a message may be transmitted to a payment network to enable authorization of the remote commerce transaction at least partially in response to the determination of the validation information. For example, the payment network may implement fraud detection or analysis prior to determining whether to authorize the remote commerce transaction.

Figure 5:
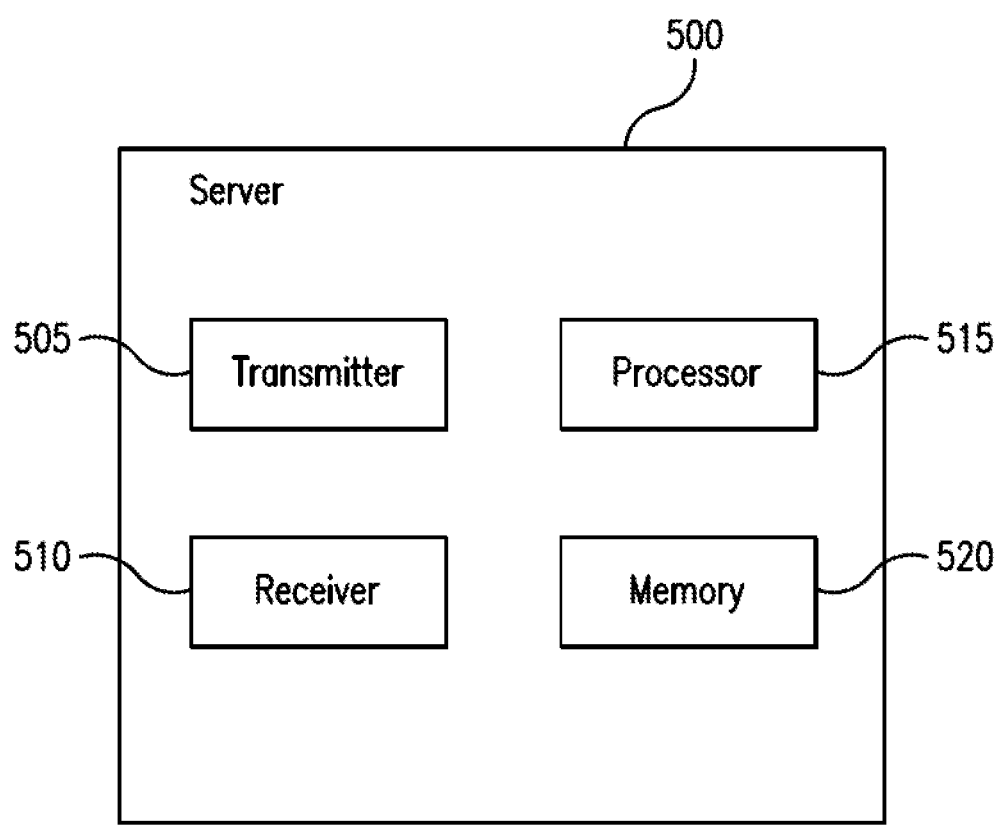
FIG. 5 illustrates a server according to an embodiment.

FIG. 5 illustrates a server 500 according to an embodiment. Server 500 may comprise a payment server, an issuer server, and/or an acquirer server such as those discussed above with respect to FIG. 1, for example. As illustrated, server 500 may include a transmitter 505 which may transmit various signals and/or messages. A receiver 510 may receive various signals and/or messages, such as from other or more other servers, computing devices, and/or network elements, for example. A processor 515 may execute computer-executable code stored in a memory 520 and/or may store data or other information in the memory 520.

As will be appreciated based on the foregoing specification, one or more aspects of the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method to be performed at a server, the method comprising:
    receiving an authorization request message for a remote commerce transaction between a customer and a merchant, wherein the authorization request message comprises a merchant universal payment identifier (MuPi) and a terminal identifier (ID) associated with the merchant, wherein the MuPi comprises a uniform resource locator (URL)-based merchant identifier and a manifest file deployed at the URL;
    extracting the MuPi from the authorization request message;
    extracting the manifest file from the URL;
    extracting a registration signature for the merchant from the manifest file;
    validating an identity of the merchant based on the MuPi by determining validation information for the MuPi, the validation information comprising a security level indicator indicating a measure of confidence that the identity of the merchant is valid and accessing, based on the MuPi, a risk profile received for the merchant for previous transactions, and
    deterministically determining whether the terminal ID received belong to the same merchant for which the MuPi was initially created,
    wherein the identity of the merchant is validated based at least partially on the extracted registration signature for the merchant and based on the risk profile and on the security level indicator being at or above a threshold confidence level;
    binding the MuPi to a cryptogram for the merchant in response to the validating the identity of the merchant; and
    transmitting a message to a payment network and authorizing the remote commerce transaction at least partially in response to the validation of the identity of the merchant, the message comprising the cryptogram for the merchant.

2. The method of claim 1, wherein the determining the validation information comprises invalidating the MuPi in response to determining that a measure of confidence that the merchant is valid is below a threshold value.

3. The method of claim 1, wherein the MuPi comprises a cryptographically verifiable identifier.

4. The method of claim 1, wherein a payment transaction is bound to the MuPi for the remote commerce transaction.

5. A server comprising:
    a receiver to receive an authorization request message for a remote commerce transaction between a customer and a merchant, wherein the authorization request message comprises a merchant universal payment identifier (MuPi) and a terminal identifier (ID) associated with the merchant, wherein the MuPi comprises a uniform resource locator (URL)-based merchant identifier and a manifest file deployed at the URL;
    a processor to:
        extract the MuPi from the authorization request message and determine validation information for the MuPi;
        extract the manifest file from the URL;
        extract a registration signature for the merchant from the manifest file;
        validate an identity of the merchant based on the MuPi by
            determining validation information for the MuPi, the validation information comprising a security level indicator indicating a measure of confidence that the identity of the merchant is valid and accessing, based on the MuPi, a risk profile received for the merchant for previous transactions, and
            deterministically determining whether the terminal ID received belong to the same merchant for which the MuPi was initially created,
            wherein the identity of the merchant is validated based at least partially on the extracted registration signature for the merchant and based on the risk profile and on the security level indicator being at or above a threshold confidence level; and bind the MuPi to a cryptogram for the merchant in response to the validating the identity of the merchant; and a transmitter to transmit a message to a payment network and authorize the remote commerce transaction at least partially in response to the validation of the identity of the merchant, the message comprising the cryptogram for the merchant.

6. The server of claim 5, wherein the MuPi comprises a cryptographically verifiable identifier.

7. The server of claim 5, wherein the determining the validation information by the processor comprises invalidating the MuPi in response to determining that a measure of confidence that the merchant is valid is below a threshold value.

8. The server of claim 5, wherein a payment transaction is bound to the MuPi for the remote commerce transaction.

9. A method performed at a merchant device associated with a merchant, the method comprising:

registering a merchant universal payment identifier (MuPi) associated with the merchant with an authorized merchant registrar (AMR);

receiving a JavaScript Object Notation (JSON) Web Token (JWT) from the AMR;

generating a merchant manifest associated with the merchant, wherein the merchant manifest comprises the JWT;

storing the merchant manifest at a particular uniform resource locator (URL) address;

receiving a validation signature from the AMR;

updating the merchant manifest to include the validation signature, wherein the validation signature is usable to validate an identity of the merchant associated with the MuPi, wherein an association between the MuPi and a network cryptogram is generated;

responsive to an authorization transaction comprising the MuPi and a terminal identifier (ID) associated with the merchant being subsequently processed for the merchant device, accessing, based on the MuPi, a risk profile received for the merchant for previous transactions, an identity of the merchant device being determined based on the risk profile and on the association between the MuPi and the network cryptogram; and deterministically determining whether the terminal identifier (ID) received belong to the same merchant for which the MuPi was initially created.

10. The method of claim 9, further comprising transmitting a message comprising the MuPi to the AMR to request validation of the MuPi.

11. The method of claim 10, further comprising receiving a validation of a signature of the MuPi from the AMR in response to transmitting the message comprising the MuPi to the AMR to request the validation of the MuPi.

12. The method of claim 9, wherein the JWT comprises a MuPi URL address where the MuPi is stored and an issuer URL address of an issuer.

13. The method of claim 9, further comprising onboarding with the AMR before registering the MuPi with the AMR.

14. The method of claim 9, wherein the MuPi comprises a cryptographically verifiable identifier.

15. A merchant device associated with a merchant, comprising:

a transmitter to transmit a first message to an authorized merchant registrar (AMR), wherein the first message comprises a request to register a merchant universal payment identifier (MuPi) associated with the merchant with the AMR;

a receiver to receive a second message from the AMR, wherein the second message comprises a JavaScript Object Notation (JSON) Web Token (JWT);

a processor to:

generate a merchant manifest associated with the merchant, wherein the merchant manifest comprises the JWT;

initiate storage of the merchant manifest at a particular uniform resource locator (URL) address;

receive a validation signature from the AMR;

update the merchant manifest to include the validation signature, wherein the validation signature is usable to validate an identity of the merchant associated with the MuPi, wherein an association between the MuPi and a network cryptogram is generated;

responsive to an authorization transaction comprising the MuPi and a terminal identifier (ID) associated with the merchant being subsequently processed for the merchant device, accessing, based on the MuPi, a risk profile received for the merchant for previous transactions, an identity of the merchant device being determined based on the risk profile and on the association between the MuPi and the network cryptogram; and deterministically determining whether the terminal identifier (ID) received belong to the same merchant for which the MuPi was initially created.

16. The merchant device of claim 15, wherein the processor is to further initiate transmission of a message comprising the MuPi to the AMR to request the validation of the MuPi.

17. The merchant device of claim 16, wherein the processor is to process the received validation of a signature of the MuPi from the AMR in response to the initiation of transmission of the message comprising the MuPi to the AMR to request the validation of the MuPi.

18. The merchant device of claim 15, wherein the JWT comprises a MuPi URL address where the MuPi is stored and an issuer URL address of an issuer.

19. The merchant device of claim 15, wherein the MuPi comprises a cryptographically verifiable identifier.

20. The merchant device of claim 15, wherein the MuPi comprises a URL-based merchant identifier and a manifest file, associated with the merchant manifest, deployed at the URL.

21. An article, comprising:

a non-transitory storage medium comprising machine-readable instructions executable by one or more processors to:

register a merchant universal payment identifier (MuPi) associated with a merchant with an authorized merchant registrar (AMR);

process a received JavaScript Object Notation (JSON) Web Token (JWT) from the AMR;

generate a merchant manifest associated with the merchant, wherein the merchant manifest comprises the JWT;

initiate storage of the merchant manifest at a particular uniform resource locator (URL) address;

receive a validation signature from the AMR;

update the merchant manifest to include the validation signature, wherein the validation signature is usable to validate an identity of the merchant associated with the MuPi, wherein an association between the MuPi and a network cryptogram is generated;

responsive to an authorization transaction comprising the MuPi and a terminal identifier (ID) associated with the merchant being subsequently processed for the merchant device, accessing, based on the MuPi, a risk profile received for the merchant for previous transactions, an identity of the merchant device being determined based on the risk profile and on the association between the MuPi and the network cryptogram; and deterministically determining whether the terminal identifier (ID) received belong to the same merchant for which the MuPi was initially created.

22. The article of claim 21, wherein the MuPi comprises a URL-based merchant identifier and a manifest file, associated with the merchant manifest, deployed at the URL.

* * * * *